(12) United States Patent
Szulczewski

(10) Patent No.: US 8,468,083 B1
(45) Date of Patent: Jun. 18, 2013

(54) ADVERTISEMENT TOPIC DIVERSIFICATION AND RANKING

(75) Inventor: Piotr Szulczewski, San Francisco, CA (US)

(73) Assignee: Google Inc., Mountain View, CA (US)

( * ) Notice: Subject to any disclaimer, the term of this patent is extended or adjusted under 35 U.S.C. 154(b) by 1221 days.

(21) Appl. No.: 11/837,070

(22) Filed: Aug. 10, 2007

(51) Int. Cl.
*G06Q 40/00* (2012.01)

(52) U.S. Cl.
USPC ............................ 705/37; 705/38 R; 705/36 R

(58) Field of Classification Search
USPC ....................................................... 705/35–38
See application file for complete search history.

(56) References Cited

U.S. PATENT DOCUMENTS

| | | | |
|---|---|---|---|
| 6,021,397 A | * | 2/2000 | Jones et al. .................. 705/36 R |
| 2001/0042785 A1 | * | 11/2001 | Walker et al. .................. 235/379 |
| 2004/0117302 A1 | * | 6/2004 | Weichert et al. ................. 705/40 |
| 2005/0261953 A1 | * | 11/2005 | Malek et al. ..................... 705/10 |
| 2006/0004704 A1 | * | 1/2006 | Gross ................................ 707/2 |
| 2007/0050389 A1 | * | 3/2007 | Kim et al. ...................... 707/101 |

OTHER PUBLICATIONS

Marchex Renews Search Marketing Distribution Relationship with Yahoo! Anonymous. Business Wire. New York: Aug 9, 2007.*

* cited by examiner

*Primary Examiner* — Hani M Kazimi
*Assistant Examiner* — Clement B Graham
(74) *Attorney, Agent, or Firm* — Fish & Richardson P.C.

(57) ABSTRACT

One or more first groups of one or more first content items are identified. A first score is determined for each of the one or more first groups. A second group of one or more second content items is identified. At least one of the one or more second groups correspond to at least one of the one or more first groups. A second score is determined for each of the one or more second groups. A third score is determined for the first groups and the corresponding second group based on the first scores and second scores. An adjustment is made to a ranking of the one or more first content items based on the third scores.

25 Claims, 8 Drawing Sheets

ADVERTISEMENT TOPIC DIVERSIFICATION AND RANKING

BACKGROUND

This document relates to advertising.

As the Internet has grown, online advertising has become a popular method by which advertisers can reach consumers. Online advertising provides opportunities for advertisers to target their advertisements to a receptive audience. Advertisements can be identified by one or more content servers in response to queries. The queries can, for example, include search engine queries.

Such queries, however, may not readily identify a particular context that is of interest to the user. For example, the query "Blazers" could be used in a clothing context, an automobile context, a sports context, a pop-culture context, etc. If advertisements or other content items related to the context of the query are not identified, then the advertisements may not reflect relevant content to a user. For example, a user may be interested in a pop-culture context related to the term "Blazer," but may receive advertisements relevant only to other contexts, such as a clothing and sports context, as advertisements related to these other contexts may be deemed more relevant by an advertisement serving engine.

SUMMARY

Disclosed herein are systems, apparatus and methods for diversifying and ranking advertisement topics and presenting advertisements. To diversify the identification and presentation of advertisements, search results identified in response to a query are clustered according to context and the advertisements identified in response to the query are also clustered according to context. Each advertisement cluster is scored based on the advertisements in the cluster, and each search results cluster is also scored based on the search results in the cluster. Corresponding advertisement cluster scores and search result cluster scores are combined to determine a context score. The advertisements presented can be modified based on the context scores.

In one implementation, one or more first groups of one or more first content items, e.g., advertisements, are identified. A first score is determined for each of the one or more first groups. One or more second groups of one or more second content items, e.g., search results, are identified. At least one of the one or more second groups correspond to at least one of the one or more first groups. A second score is determined for each of the one or more second groups. A third score is determined for the first groups and the corresponding second group based on the first scores and second scores. An adjustment is made to a ranking of the one or more first content items based on the third scores.

In another implementation, one or more first groups of one or more first content items are identified. One or more second groups of one or more second content items are identified. The one or more first content items in each of the first groups and the one or more second content items in each of the second groups are ranked. A determination is made on the evaluation as whether to modify the one or more first content items based on the ranking.

In another implementation, one or more first content items, e.g., advertisements, responsive to a search query are identified. One or more second content items, e.g., web pages, responsive to the search query are identified. One or more first context clusters for each of the first content items are identified. One or more second context clusters for each of the second content items are identified. A score for each of the first context clusters and second context clusters is determined. A determination is made based on the evaluation as to whether to modify the one or more first content items based on a combined score of the one or more first context clusters and a corresponding second context cluster.

In another implementation, one or more advertisements and one or more search results are identified. The one or more advertisements and one or more search results are each associated with a rank. One or more advertisements are mapped to one or more advertisement clusters. Advertisement scores that are substantially inversely proportional to a rank of the advertisements are assigned to each of the advertisements. Advertisement cluster scores are determined by adding the advertisement scores of the advertisements in each of the advertisement clusters together. The one or more search results are mapped to one or more search clusters. The search scores are assigned to each of the search results that are substantially inversely proportional to a rank of the search result. Search cluster scores are determined by adding the search scores of the search results in each of the search clusters together. A context score is determined by combining an advertisement cluster score and a corresponding search cluster score. The rank of the one or more advertisements is modified based on the context score.

In another implementation, a system includes a clustering engine and a scoring engine. The clustering engine identifies one or more first groups of one or more first content items, e.g., advertisements, and identifies one or more second groups of one or more second content items, e.g., search results. At least one of the one or more second groups correspond to at least one of the one or more first groups. The scoring engine determines first scores for each of the one or more first groups, determines second scores for each of the one or more second groups, and determines third scores for the first groups and the corresponding second groups based on the first scores and second scores. The scoring engine can also adjust a ranking of the one or more first content items based on the third scores.

The disclosed systems and methods can optionally realize one or more of the following advantages. Increasing targeted advertisements diversity to display advertisements with multiple topics can result in an optimization of advertisement consumption, as one of the multiple topics may correspond to a user's current interest. Furthermore, the advertisement selection process can be augmented by using context associated with a user to select advertisement contexts and can give users more options in a particular advertisement space. Updating a ranking process, e.g., ranking according to advertisement context and, if augmented, according to the user context, can cause the advertisement list to be reordered to optimize advertisement consumption. These advantages and other advantages may be separately realized by one or more of the example implementations described below.

DETAILED DESCRIPTION

Figure 1:
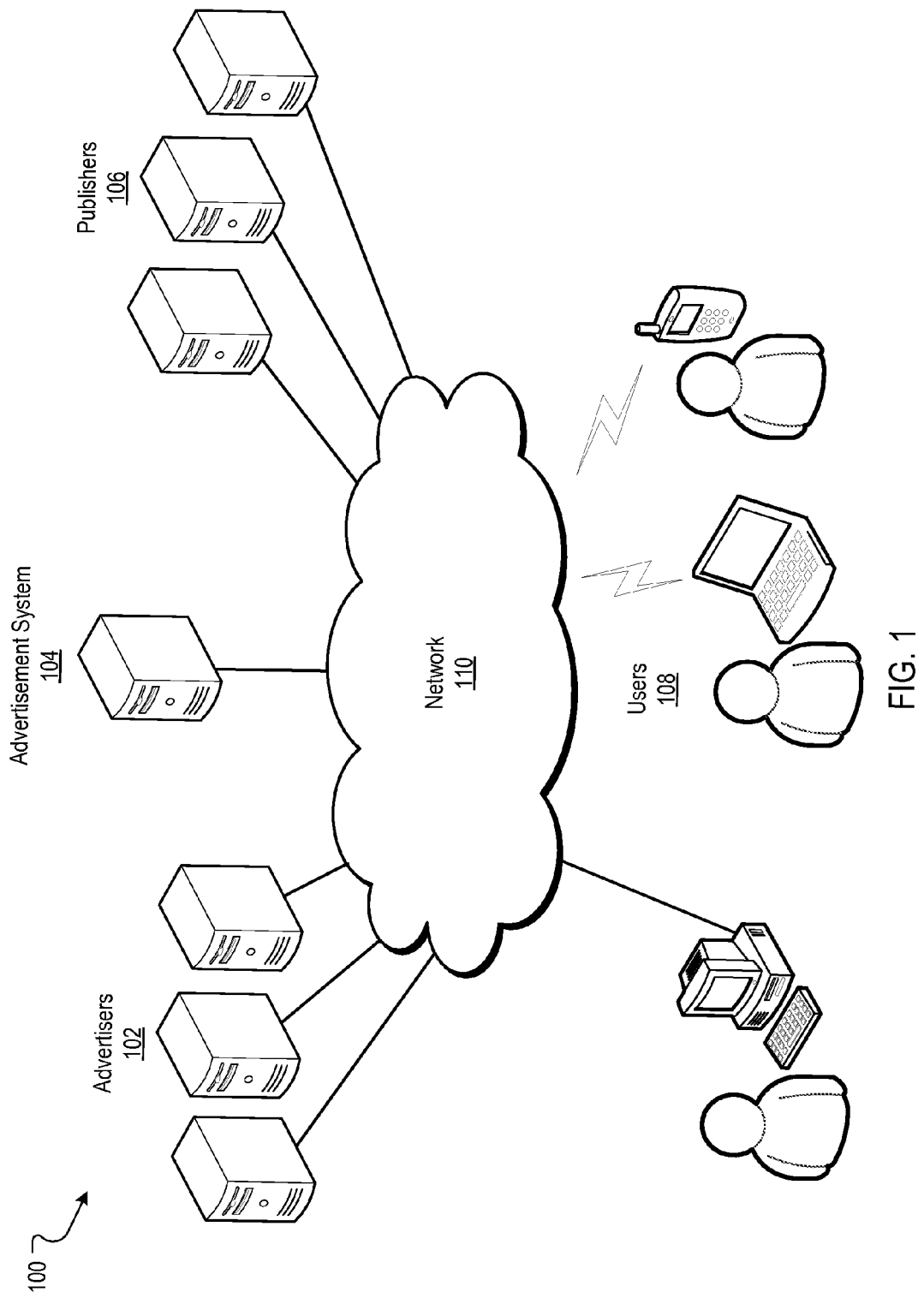
FIG. 1 is a block diagram of an implementation of an online advertising system.

FIG. 1 is a block diagram of an implementation of an online advertising system 100. A computer network 110, such as a local area network (LAN), wide area network (WAN), the Internet, or a combination thereof, connects the advertisers 102, an advertising system 104, publishers 106, and users 108.

In some implementations, one or more advertisers 102 can directly, or indirectly, enter, maintain, and track advertisement ("ad") information in an advertisement system 104. The advertisements may be in the form of graphical advertisements, such as banner advertisements, text only advertisements, image advertisements, audio advertisements, video advertisements, advertisements combining one of more of any of such components, etc. The advertisements may also include embedded information, such as links, meta-information, and/or machine executable instructions. One or more publishers 106 may submit requests for advertisements to the system 104. The system 104 responds by sending advertisements (e.g., when an associated publication is rendered) to the requesting publisher 106 for placement on one or more of the publisher's web properties (e.g., websites and other network-distributed content). While reference is made to advertisements, other content items can be provided by the system 104.

Other entities, such as users 108 and the advertisers 102, can provide usage information to the system 104, such as, for example, whether a click-through related to an advertisement has occurred, whether a conversion has occurred, or whether some other defined event has occurred. Such usage information can be processed to measure performance metrics, such as click-through rates, conversion rates, etc.

A click-through can occur, for example, when a user of a user device, selects or "clicks" on an advertisement. The click-through rate can be a performance metric that is obtained by dividing the number of users that clicked on the advertisement or a link associated with the advertisement by the number of times the advertisement was delivered. For example, if an advertisement is delivered 100 times, and three persons clicked on the advertisement, then the click-through rate for that advertisement is 3%.

A "conversion" occurs when a user, for example, consummates a transaction related to a previously served advertisement. What constitutes a conversion may vary from case to case and can be determined in a variety of ways. For example, a conversion may occur when a user clicks on an advertisement, is referred to the advertiser's web page, and consummates a purchase there before leaving that web page. Alternatively, a conversion may be defined as a user being shown an advertisement, and making a purchase on the advertiser's web page within a predetermined time (e.g., seven days). In yet another alternative, a conversion may be defined by an advertiser to be any measurable/observable user action such as, for example, downloading a white paper, navigating to at least a given depth of a website, viewing at least a certain number of web pages, spending at least a predetermined amount of time on a website or web page, registering on a website, dialing a telephone number, sending a product or service inquiry, etc. Other definitions of what constitutes a conversion are possible.

A conversion rate can be defined as the ratio of the number of conversions to the number of impressions of the advertisement (i.e., the number of times an advertisement is rendered) or the ratio of the number of conversions to the number of selections (or the number of some other earlier event). The type of conversion rate can be apparent from the context in which it is used. If a conversion is defined to be able to occur within a predetermined time since the serving of an advertisement, one possible definition of the conversion rate might only consider advertisements that have been served more than the predetermined time in the past.

Other usage information and/or performance metrics can also be used. The usage information and/or performance metrics can, for example, be revenue related or non-revenue related. In another implementation, the performance metrics can be parsed according to time, e.g., the performance of a particular content item may be determined to be very high on weekends, moderate on weekday evenings, but very low on weekday mornings and afternoons.

This usage information can include measured or observed user behavior related to advertisements that have been served. The system 104 performs financial transactions, such as crediting the publishers 106 and charging the advertisers 102 based on the usage information.

One example of a publisher 106 is a content server (e.g., domain name registrar) that places content (e.g., articles, discussion threads, music, video, graphics, search results, web page listings, information feeds, etc.) on one or more domains. The domain registrar server may submit a request for advertisements to an advertisement server in the system 104. The advertisement request may include a number of advertisements desired. The advertisement request may also include content request information. This information can include the content itself (e.g., page or other content document), a category corresponding to the content or the content request (e.g., arts, business, computers, arts-movies, arts-music, etc.), part or all of the content request, content age, content type (e.g., text, graphics, video, audio, mixed media, etc.), geo-location information, etc.

In some implementations, the content server can combine the requested content with one or more of the advertisements provided by the system 104. This combined content and advertisements can be sent to the user 108 that requested the content for presentation in a viewer (e.g., a browser or other content display system). The content server can transmit information about the advertisements back to the advertisement server, including information describing how, when, and/or where the advertisements are to be rendered (e.g., in HTML or JavaScript™).

As can be appreciated from the foregoing, the advertising management system 104 can serve publishers 106 such as content servers. The system 104 permits serving of advertisements targeted to content (e.g., documents) served by content servers. For example, a network or inter-network may include an advertisement server serving targeted advertisements in response to requests from a content server with advertisement spots. Suppose that the inter-network is the World Wide Web. One or more content servers may include one or more documents. Documents may include web pages, email, content, embedded information (e.g., embedded media), meta-information and machine executable instructions, and advertisement spots. The advertisements inserted into advertisement spots in a document can vary each time the document is served or, alternatively, can have a static association with a given document.

In one implementation, the advertisement management system 104 may include an auction process to select advertisements. Advertisers may be permitted to select, or bid, an amount the advertisers are willing to pay for each click of an advertisement, e.g., a cost-per-click amount an advertiser pays when, for example, a user clicks on an advertisement. The cost-per-click can include a maximum cost-per-click, e.g., the maximum amount the advertiser is willing to pay for each click of advertisement based on a keyword. For example, advertisers A, B, and C all select, or bid, a maximum cost-per-click of $0.50, $0.75, and $1.00, respectively. The maximum amount advertiser A will pay for a click is $0.50, the maximum amount advertiser B will pay is $1.00, and the maximum amount advertiser C will pay is $0.75.

The rank of an advertisement that is displayed can be determined by multiplying the maximum cost-per-click for the advertisement by a quality score of the advertisement. The advertisement can then be placed among other advertisements in order of increasing or decreasing rank. For example, suppose the quality score of advertisers A, B, and C are "3," "1," and "1," respectively. The rank of advertiser A, B, and C can be determined as follows:

$A$: Rank=quality score×maximum cost-per-click=3.0× $0.50=1.50

$B$: Rank=quality score×maximum cost-per-click=1.0× $0.75=0.75

$C$: Rank=quality score×maximum cost-per-click=1.0× $1.00=1.00

The advertisers can be ranked as follows:
1. A
2. C
3. B

An advertisement can also be associated with an actual cost-per-click. The actual cost-per-click of the advertisement can be determined by the maximum cost-per-click of the advertisement, quality score of the advertisement, and by the amount selected or bid by the advertiser directly below. In one implementation, the actual cost-per-click can be the price that is necessary to keep the advertisement's position above the next advertisement. To determine the actual cost-per-click, the system 104 can determine how much the advertiser in position 1 would have to pay to give them a rank equal to the advertiser in position 2, and then the system 104 adds a unit amount, e.g., $0.01, to this determined amount.

To determine how much the advertiser in position 1 would have to pay to give them a rank equal to the advertiser in position 2, the rank of position 2 can be divided by the quality score of position 1 and $0.01 can be added to that amount. The last advertiser in the list can pay a minimum cost-per-click to hold the position in the list. For example, suppose the minimum cost-per-click is $0.20.
The actual cost-per-click of advertisers A, B, and C can be determined as follows:

$A$: $C$'s rank/$A$'s quality score=0.1/3=$0.33+ $0.01=$0.34

$C$: $B$'s rank/$C$'s quality score=0.75/1=$0.75+ $0.01=$0.76

$B$: minimum cost-per-click=$0.20

In this example, A would only have to pay $0.34 to hold the first position in the list of advertisements. C would have to pay $0.76 to hold the second position. Advertiser B would be required to pay the minimum cost-per-click amount of $0.20.

Keywords that are associated with advertisements can also have a separate quality score. The keyword quality score can be the basis for measuring the quality and relevance of an advertisement and determining a minimum cost-per-click. The quality score can, for example, be determined by the advertisement's click-through rate, the relevance of the advertisement text, overall historical keyword performance, and the user experience on a landing page associated with the advertisement. A minimum cost-per-click can be determined for each advertisement, and can be based on quality of the advertisement.

The minimum cost-per-click is the minimum amount the advertiser must pay for each advertisement, e.g., the minimum amount the advertiser must pay for use of a keyword. In some implementations, the system 104 can utilize a quality-based bidding auction that can determine a minimum cost per click bid requirement. For the minimum bid, a keyword's quality score can, for example, be based on the click-through rate and relevance of the keyword, the advertisement text, and the advertisement landing page. For keywords having a low quality score, which is indicative of a poorly performing keyword and/or likewise indicative of a poor user experience, the minimum cost per click is increased. Accordingly, the poorly performing keywords can become inactive for an advertiser's account if the advertiser is not willing to pay the minimum cost per click. Conversely, a high quality keyword has a lower minimum cost per click, and thus the higher quality keyword is used more often, enriching the user experience.

The ranking of the advertisements described above can be modified according to one or more identified contexts. A context can, for example, define a specific context of a query, web page, document, or content item. As an example, the query "jaguar" can have the following contexts: jaguar car, jaguar animal, or jaguar game system. As such, a particular web page would generally be associated with one of the above general contexts. Accordingly, a context cluster can be defined by one or more content items, e.g., web pages, grouped under a similar context or topic. For example, web pages related to "jaguar" in a sports context may define a cluster; web pages related to "jaguar" in a wildlife context may define a cluster; advertisements related to "jaguar" in a sports context may define a cluster; advertisements related to "jaguar" in a wildlife context may define a cluster, etc.

A context score can, for example, be a value resulting from the combining of an advertisement cluster score and a corresponding content cluster score. For example, the context score may be calculated by combining an advertisement score and the content score of a particular search query or web page. In one implementation, the advertisement score can be calculated to be substantially inversely proportional to a rank of the advertisements. In general, context scores can be calculated by extracting, ranking, clustering, and/or scoring one or more similarities between topics within the content items or clusters. The context scores can be used to adjust advertisement rankings and/or advertisement presentations.

In some implementations, the advertisement system 104 can augment the advertisement rankings based on context scores by utilizing data related to user-specific topics. For example, the advertisement system 104 can provide advertisements corresponding to information accessed from a user-accessed search query, web page, web log, profile, or other user-associated feature or context. In some implementations, providing a variety of user-specific advertisement topics can maximize the probability that the user will find some of the advertisements relevant.

As an example, the advertisement system 104 can use context or content scores (e.g., in a user's search query or web page content) to maximize targeted advertisement diversity as well as display advertisements with topics that appropriately match a user's current context. For example, if a user search session indicates a sports context for the query "Jaguar," then the advertisement system 104 may serve four advertisements in a sports context, two advertisements in a wildlife context, two advertisements in a pop-culture context, etc.

Figure 2A:
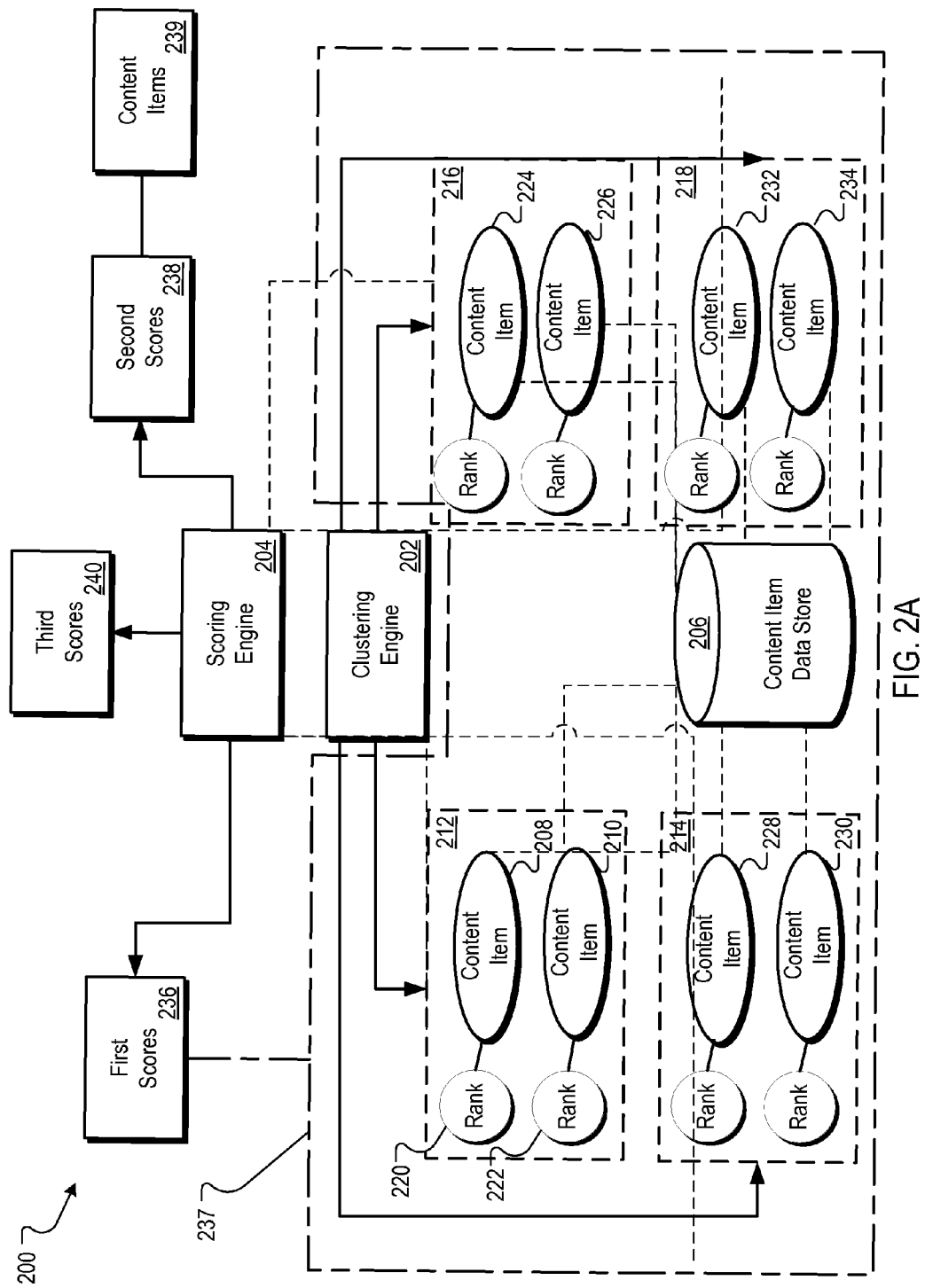
FIG. 2A is a block diagram of an example content scoring system.

FIG. 2A is a block diagram of an example content scoring system 200. The content scoring system 200 can, for example, be implemented in the advertisement system 104 utilizing one or more computing devices that include memory devices storing processing instructions and processing devices for executing the processing instructions. An example computing system is shown and described with reference to FIG. 7. Other implementations, however, can also be used.

In operation, one or more first groups, e.g., clusters 212, 214, 216 and 218 of first content items 237, e.g., content items 208, 210, 224, 226, 228, 230, 232 and 234, such as advertisements, are identified. The advertisements can, for example, be identified in response to a search query. A first score 236 is determined for each of the one or more first groups 212, 214, 216 and 218.

Additionally, one or more second groups, e.g., clusters, for second content items 239, e.g., search results, are also identified, and corresponding second scores 238 for each of the second groups are identified. The search results can also be identified in response to the search query.

Clusters for the first content items 237 and the second content items 239, e.g., advertisement clusters and search result clusters, can correspond by being associated with the same context or topic. For example, first content items, e.g., web page search results related to "jaguar" in a sports context may define a first group. Second content items, e.g., advertisements related to "jaguar" in the sports context may define a corresponding second group.

A third score 240 is determined for each of the first groups and a corresponding second group based on the first scores 236 and second scores 238. An adjustment is made to a ranking of the one or more first content items 208, 210, 224, 226, 228, 230, 232 and 234 based on the third scores. For example, the score for the "jaguar" advertisement cluster of the sports context and the score for the "jaguar" search results cluster of the sports context can be used to generate a third score related to a sports context. Likewise, scores for other context clusters can also be used to generate other third scores. These thirds scores can be used to diversify the presentation of first content items 237, e.g., advertisements, with the second content items 239, e.g., search results.

In one implementation, the content scoring system 200 can score content items by comparing search results with advertising content from system 104, for example. In particular, the content scoring system 200 can determine content scores for the search results and the advertising content related to a search query. The content scores can be used to generate context scores that are used to rank the content items according to context similarities. For example, when a search query results in a variety of distinct topics identified by a search engine, the content scoring system 200 can provide relevant and contextually ranked advertisements to the user by diversifying the advertisements based on the distinct topics. In other words, the content scoring system 200 can match advertisement topics with search results, and further can implement a scoring/ranking mechanism that will provide the user with one or more diversified advertisements.

The ranking can provide a diversified selection of advertisements. For example, rather than serving advertisements that are deemed most relevant to search query, the content scoring system 200 can use the ranking information to include advertisements for some of the other contexts in appropriately ranked positions.

In one implementation, the content scoring system 200 can identify resulting clusters that define topic contexts, e.g., sports, wildlife, pop-culture, etc. The content scoring system 200 can deem the search results clusters as currently relevant for whomever/wherever the search query was performed. As such, system 200 can use the content scores of each content item in each cluster to generate corresponding cluster scores to ensure the ranked list of scored advertisement clusters reflects the ranked list of scored search result clusters. For example, the content scoring system 200 can re-rank one or more ranked advertisement lists based on cluster scores. To illustrate, suppose a search query for "Italian restaurants" is entered into a search engine. System 200 can use the search results created from the query "Italian restaurants" and the advertisements created from the query "Italian restaurants" to generate topic clusters for the advertisements and search results. The topic clusters can be scored, and the resulting cluster scores can be used to provide advertisements that not only relate to Italian restaurants, but also advertisements that relate to other restaurants, restaurant coupons, Italy vacations, other entertainment categories, etc.

Table 1 below illustrates such diversification. The first column, search results, represents a presentation of the ten most relevant search results to a query, and the corresponding context of the search result. The second column, undiversified advertisements, represents a presentation of a subset of advertisements that are ranked according to an auction and relevance process, and the corresponding context of each advertisement. The third column, diversified advertisements, represents a presentation of the subset of advertisements of the second column after the advertisements are rank-adjusted according to the third scores described above.

TABLE 1

Example Advertisement Diversification

| Search Results | Undiversified Advertisements | Diversified Advertisements |
|---|---|---|
| SR1 - Sports | AD1 - Sports | AD1 - Sports |
| SR2 - Sports | AD2 - Sports | AD2 - Sports |
| SR3 - Sports | AD3 - Sports | AD3 - Sports |
| SR4 - Sports | AD4 - Sports | AD4' - Fashion |
| SR5 - Sports | AD5 - Sports | AD5' - Fashion |
| SR6 - Sports | AD6 - Sports | AD6' - Literature |
| SR7 - Sports | AD7 - Sports | AD7' - Literature |
| SR8 - Fashion | AD8 - Sports | AD8' - Entertainment |
| SR9 - Literature | AD9 - News | AD9' - Entertainment |
| SR10 - News | AD10 - Nature | AD10' - Nature |

As Table 1 illustrates, the third scores can be used to adjust the ranking of set of advertisements responsive to a query to present advertisements related to different topics. Such diversification can thus increase the likelihood that a user may select an advertisement. For example, the user that submitted a query to a search engine that resulted in the search results of Table 1 may not be interested in a sports topic, but may instead be interested in a fashion topic. The list of undiversified advertisements, however, do not include any fashion-related advertisements. The diversified list of advertisements, however, does include fashion related advertisements that may be of interest to the user.

Although only ten search results and advertisements are shown, the clustering, scoring and ranking of content items can be carried out on an entire set of search results and advertisements identified in response to a query. Fewer or more search results and/or advertisements can be shown.

In addition to scoring search results, the content scoring system 200 can, for example, score web page content. As an example, content, such as a web page related to mp3 player reviews, may have many contexts (e.g., context based on brand names, or generic descriptors, such as "media player," etc.) with which content scoring 200 can score and/or rank. The score and rank can be used to determine which advertisements are significantly relevant to a particular website. In general, the rank can be based on one or more context or content scores created by system 100, 200, or another system, for example.

In an implementation, the content scoring system 200 can, for example, include a clustering engine 202, a scoring engine 204, and a content item data store 206. In one implementation, the content item data store 206 can comprise a unitary data store, such as a hard drive. In another implementation, the content data store 206 can comprise a distributed data store, such as a storage system that is distributed over a network. Other implementations, however, can also be used. The content data store 206 can, for example, store one or more advertisements. Each advertisement in the content data store 206 can be associated with one or more performance metrics, e.g., click-through rates, and auction metrics, e.g., cost-per-clicks, etc.

In one implementation, the scoring engine 204 can determine ranking metrics for content items such as advertisements, e.g., content items 208, 210, 224, 226, 228, 230, 232, and 234, according to corresponding context clusters, e.g., clusters 212, 214, 216 and 218. Although scoring engine 204 is described as providing ranking metrics and scoring metrics, system 200 can call upon engine 202, engine 204, or another software and/or hardware entity to perform any or all of the disclosed tasks.

The clustering engine 202 can, for example, identify similarities within various groups of content items. For example, the similar groups of content items 208, 210 can be stored in the context cluster 212. Each context cluster (e.g., cluster 212, 214, 216, and 218) can include one or more content items. The clustering engine 202 can, for example, cluster content items 208 and 210 in the context cluster 212 by identifying that the content items are generally related to one another by topic, genre, category, or other context. In some implementations, the context clusters for advertisements of search results pages can be pre-computed by a page classifier. In other implementations, the context clusters for advertisements can be computed at run-time.

In some implementations, the clustering engine 202 can, for example, identify and/or receive the content items in response to a search query. For example, the clustering engine 202 can identify relevant advertisements based on user entered search terms. In some implementations, the clustering engine 202 can, for example, identify one or more clusters 212, 214, 216, 218 based on web page content associated with the advertisements. For example, the identified content items 208, 210 can be grouped into cluster 212 based on their context in a landing page associated with the advertisement, e.g., pages on an advertiser website that a user is directed to when the user clicks an advertisement. In a similar manner, the clustering engine 202 can group content items 224, 226 into cluster 216; content items 228, 230 into cluster 214; content items 232, 234 into cluster 218, and so on. Other clustering techniques can also be used.

In one implementation, clustering engine 202 can generate a cluster score for a content item cluster based on content item scores of the content items, e.g., scoring ranks 220 and 222 of the content items 208 and 210. In particular, the scoring engine 204 can rank content items according to relevancy for a particular topic, context, or available advertisement, for example. The ranks 220 and 222 can, for example, be determined by advertisement system 104, or the content scoring system 200, or another system.

A similar clustering and ranking process can be used to identify cluster scores for second content items 239, such as search results, and generate corresponding second scores 238. The corresponding clusters for the first and second content items 237 and 239 and the first and second scores 236 and 238 can be used to generate third scores 240, as will be described below. The third scores, in turn, are used to adjust a raking and/or presentation of the first content items, e.g., advertisements.

Figure 2B:
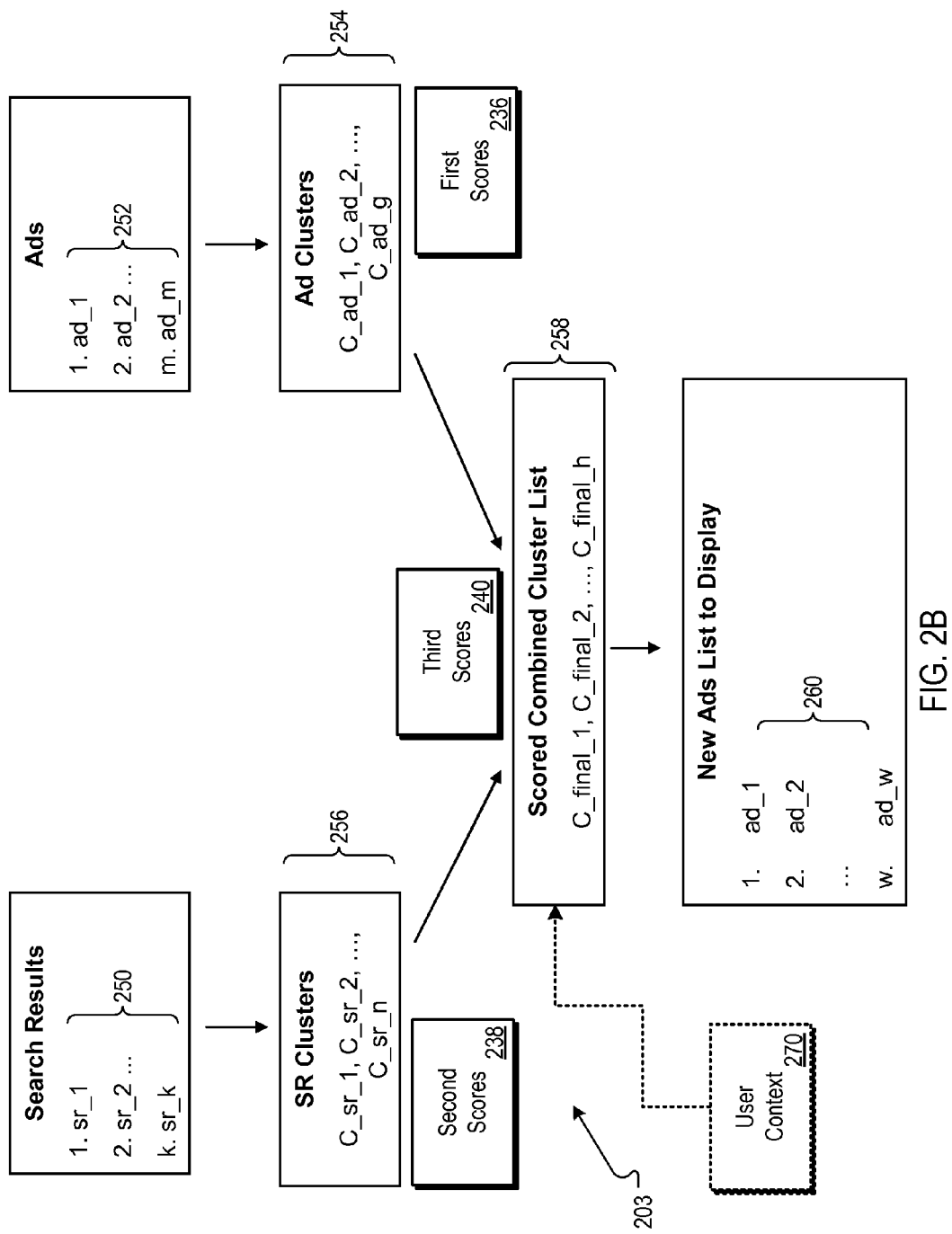
FIG. 2B is a block diagram of the ranking and scoring logic of the content scoring system.

FIG. 2B is a block diagram of the ranking and scoring logic 203 of the content scoring system 200. The scoring logic 203 can be implemented in the clustering engine 202 and scoring engine 204 of FIG. 2A.

In operation, the scoring engine 204 can, for example, determine the first scores 236, the second scores 238, and the third scores 240. As an example, suppose the following search results 250 that are responsive to a query: (1) $SR\_1$; (2) $SR\_2$; (3) $SR\_3$; (4) $SR\_4$; (5) $SR\_5$; (6) $SR\_6$; (7) $SR\_7$; (8) $SR\_8$; (9) $SR\_9$; and (10) $SR\_k$. Similarly, suppose the following advertisements 252 are responsive to the query: 1) $AD\_1$; (2) $AD\_2$; (3) $AD\_3$; (4) $AD\_4$; (5) $AD\_5$; (6) $AD\_6$; (7) $AD\_7$; (8) $AD\_8$; (9) $AD\_9$; and (10) $AD\_m$. Each search result SR and advertisement AD can have an associated ranking. For example, each SR and AD can have a ranking value that represents the ranking of the corresponding search result and advertisement in response to the query.

Absent any contextual consideration, the advertisements could be presented according to their respective rankings, e.g., as similarly illustrated by the columns "Search Results" and "Undiversified Advertisements" of Table 1. However, to diversify the advertisement presentation, the advertisements may be re-ranked and/or selected according to the advertisement contexts and the search result contexts. Thus, the clustering engine 202 can identify search result clusters 256 and advertisement clusters 254. In some implementations, K-means and singular value decomposition (SVD) clustering techniques can be used to generate the clusters 254 and 256. Other clustering techniques can also be used.

The scoring engine 204 can generate a corresponding content score for each search result SR and advertisement AD that is substantially inversely proportional to the corresponding ranking of the search result or advertisement. These content scores can be summed to generate the first scores 236 and the second scores 238. In one implementation, the scoring engine 204 computes the first scores 236 for each advertisement cluster 254 according to the formula:

$$C\_AD\_k = \Sigma AD\_i/i$$

where i is the advertisement rank, and $AD\_i$ is an advertisement score for an advertisement belonging to the cluster $C\_AD\_k$, and $C\_AD\_k$ is the cluster score for a particular cluster of type k, e.g., k=sports, k=wildlife, etc.

Similarly, the scoring engine 204 can determine the second score 238 for the search result clusters according to the formula:

$$C\_k\ SR\_j = \Sigma SR\_j/j$$

where j is the search result rank, and SR_j is a search result score for a search result belonging to the cluster C_SR_k j, and C_SR_k j is the cluster score for a particular cluster k.

The scoring engine 204 can determine third scores 240 based on the first scores 236 and the second scores 240. In one implementation, the scoring engine 204 can multiply the first score 236 of each cluster 254 by the second score 238 of each cluster 256 to determine the third scores 240. For example, the scoring engine 204 can determine the third scores 240 for the search result clusters according to the formula:

$$C\_k\ final = C\_SR\_k * C\_AD\_k$$

Other scoring schemes to determine the third scores can also be used. For example, the scoring engine 204 can determine the third scores 240 for the search results clusters according to the alternate formula:

$$C\_final = (1 + C\_SR\_k)^{\wedge}(\text{weight\_search\_results}) * (1 + C\_AD\_k)^{\wedge}(\text{weight\_ads})$$

Where weight_search_results and weight_ads represents the importance of the search results clusters and ad clusters. The weight_search_results and weight_ads can be calculated through experimentation to determine which weight_search_results and weight_ads to use in the calculation. For example, the weight_search_results and weight_ads can be calculated based on a statistical analysis of advertisement click-through rates as the variables weight_search_results and weight_ads are adjusted during a testing period. The variables weight_search_results and weight_ads that maximize overall click-through rates can then be selected. Other evaluation techniques can also be used.

The third scores 240 can, for example, be used to rank the clusters according to relevancy for a particular user. The third scores 240 represent a combined scored ordered list of context clusters and can be used to select advertisements of different contexts. For example, in one implementation, as illustrated in Table 1 above, the first k highest ranked advertisements, e.g., k=3, may be shown according to the ranking 252, but the remaining advertisements, e.g., ranks 4 . . . m (m=10), can be selected to include advertisements from the highest rated advertisement clusters as defined by the third scores 240. Thus, advertisements in contexts that were underrepresented (or not represented at all) in the original ranking 252 (e.g., the undiversified advertisements column of Table 1) can be displayed according to the adjusted advertisement ranking 260 (e.g., the diversified advertisements column of Table 1). Other adjustment schemes can be used based on the third scores 240.

In some implementations, the content scoring system 200 can, for example, augment the selections described in FIGS. 2A and 2B based on an identified context of a user's session, e.g., a user context 270. The user context 270 can include information derived from visited websites (e.g., topic, title, context, phrases, metadata information, etc.), web log entries, website visits, previous search queries, membership in communities, location, demographics, or other web related content, and the like. For example, rather than providing several users the same advertisements according to the ranking 260 of FIG. 2B, the system 200 can analyze various user-dependent factors for each user to provide user-relevant advertisements for each independent user while still providing diverse advertisements. For example, a user context 270 may indicate that a user is currently interesting in a sports context; accordingly, sports-related clusters for the search result clusters 256 and the advertisement clusters 254 may be scaled to generate higher cluster scores.

Figure 3:
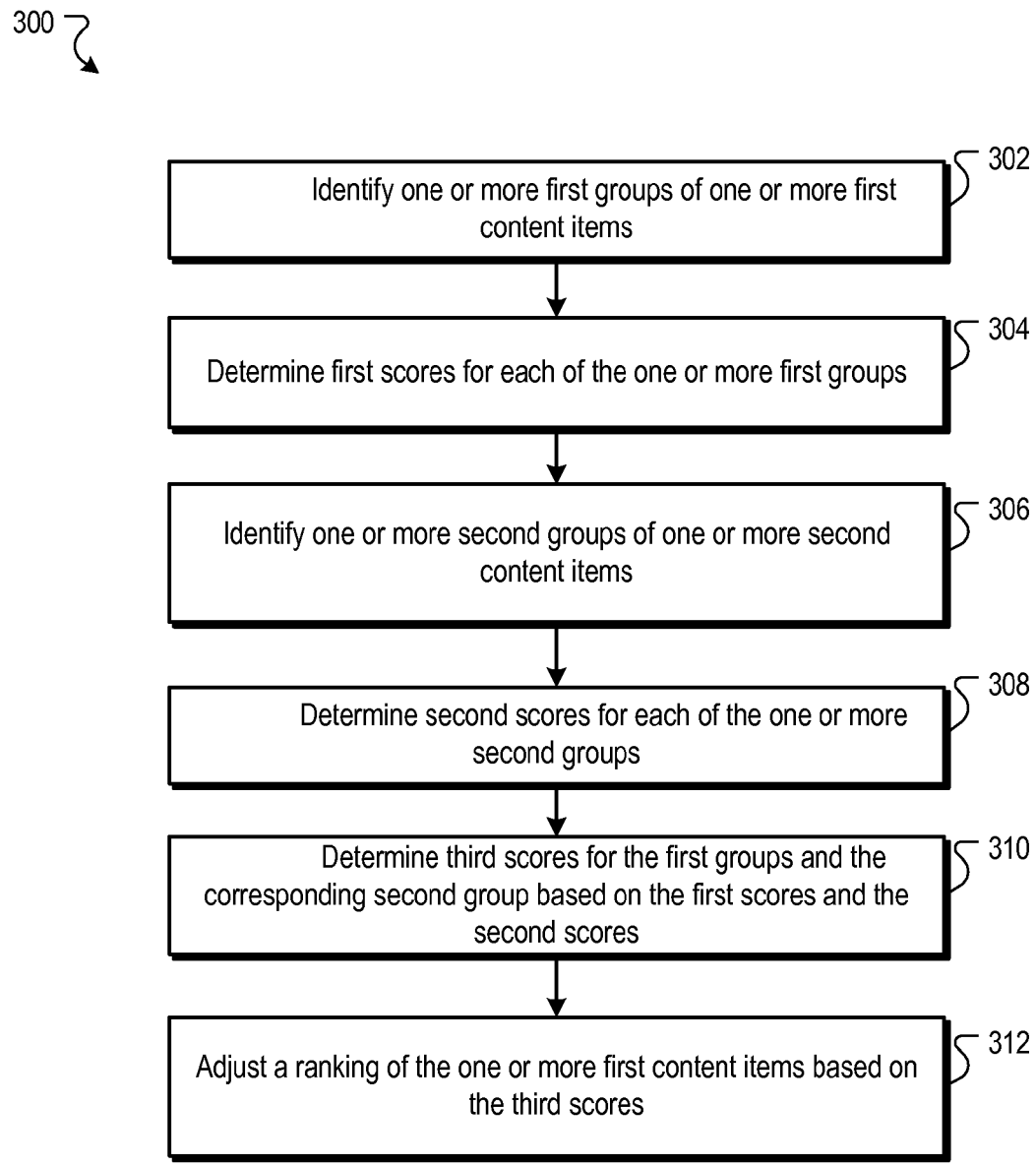
FIG. 3 is a flow diagram of an example process for adjusting a ranking of a content item.

FIG. 3 is a flow diagram of an example process 300 for adjusting a ranking of a content item. The process 300 can, for example, be implemented in a system such as the content scoring system 200 of FIGS. 2A and 2B.

Stage 302 identifies one or more first groups of one or more first content items. For example, the clustering engine 202 can identify one or more first groups of content items. Content items can include advertisements, web page content, search results, and other ad-targeted content. In this example, the first group of content items generally includes advertisements. In one implementation, the clustering engine 202 can identify the first group of content items, e.g., advertisements based on web page content. In another implementation, the clustering engine 202 can identify the first group of content items, e.g., advertisements, based on a search query.

The clustering engine 202 can, for example, identify one or more first groups by determining the contexts of each of the content items in the groups. Further, the clustering engine 202 can identify the one or more first groups based on the identified contexts, e.g., advertisement topics. For example, the first group of content items can be assigned a particular context to function as an identifier in system 200. Such an identifier can serve to categorize a group and/or cluster of content items, for example.

Stage 304 determines first scores for each of the one or more first groups. For example, the scoring engine 204 can determine scores, e.g., advertisement scores, for each of the one or more first groups. The scoring engine 204 can, for example, determine the score using various weighting techniques or mathematical methods determined by system 100, 200, or another system. One example technique for determining the score of the first group can include assigning a first content score to each of the first content items that is substantially inversely proportional to a ranking of the first content item. Further, the calculated scores can be added together to produce the first score. For example, scoring engine 204 can calculate and combine the scores to produce the first score 236, e.g., cluster scores Stage 306 identifies one or more second groups of one or more second content items. For example, the clustering engine 202 can identify one or more second groups of one or more second content items. In one implementation, at least one of the one or more second groups correspond to at least one of the one or more first groups. The correspondence between the first and second group can be based on a first and second group having a similar context or topic. In this example, the second group of content items generally includes search results or web page content. The clustering engine 202 can, for example, determine contexts of each of the second content items in the groups. Further, the clustering engine 202 can identify the one or more second groups based on the identified contexts, e.g., search results, webpage content, etc. In one implementation, the clustering engine 202 can identify the second group of content items, e.g., search results, based on web page content. In another implementation, the clustering engine 202 can identify the second group of content items, e.g., search results, based on a search query.

Stage 308 determines second scores for each of the one or more second groups. For example, the scoring engine 204 can determine scores, e.g., search result scores, for each of the one or more second groups. One example technique for determining the score for the second group can include assigning a second content score to each of the second content items that is substantially inversely proportional to a ranking of the second content item. Further, the calculated scores can then be added together to determine a second score. For example, scoring engine 204 can combine the scores to determine the second score 238.

Stage 310 determines third scores for the first groups and a corresponding second group based on the first scores and the second scores. For example, the scoring engine 204 can determine third scores for the first groups and a corresponding second group based on the first and second scores. In one implementation, the third score can be calculated for each cluster pair. For example, the scoring engine 204 can multiply the first score and the second score to determine a cluster score for each cluster. The cluster scores can, for example, be used to rank the clusters according to relevancy for a user. In one implementation, the cluster score can be used to adjust a ranking of the one or more clusters.

Stage 312 adjusts a ranking of the one or more first content items based on the third scores. For example, the scoring engine 204 can adjust the ranking of the one or more first content items based on the determined third scores. The adjustment can prompt system 200 to modify which advertisements are provided for the respective search result or web page content, for example. As such, the system 200 can modify advertisement display to display advertisements with topics that align with a user's current context within the search query or web page.

Figure 4:
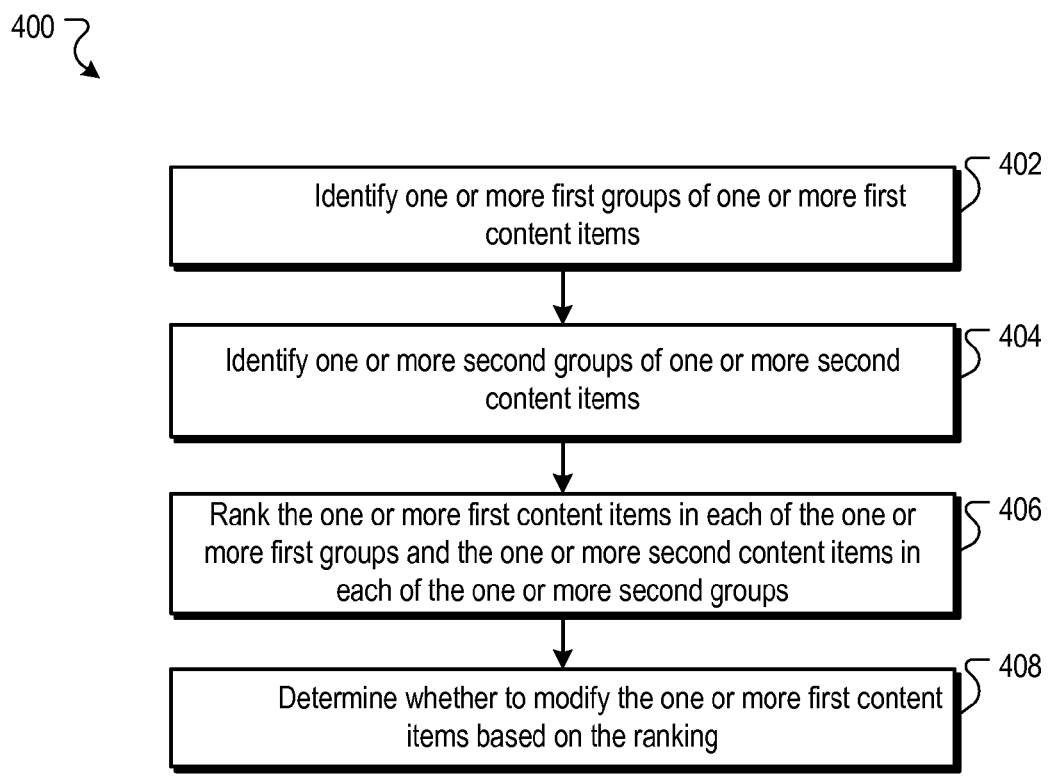
FIG. 4 is an example process for modifying content items based on a ranking.

FIG. 4 is an example process 400 for modifying content items based on a ranking. The process 400 can, for example, be implemented in a system such as the content scoring system 200 of FIGS. 2A and 2B.

Stage 402 identifies one or more first groups of one or more first content items. For example, the clustering engine 202 can identify one or more first groups of one or more first content items. In one implementation, identifying one or more first groups can include determining the context of each of the first content items and identifying the one or more first groups based on the identified context.

Stage 404 identifies one or more second groups of one or more second content items. For example, the clustering engine 202 can identify one or more second groups of one or more second content items. In one implementation, at least one of the one or more second groups correspond to at least one of the first groups. For example, context in a search content item (second group or cluster) can correspond to context in an advertisement (first group or cluster).

Stage 406 ranks the one or more first content items in each of the first groups and the one or more content items in each of the second groups. For example, the scoring engine 204 can rank the one or more first content items in each of the first groups and the one or more content items in each of the one or more second groups. The ranking process can include determining first scores for each of the first content items and second content items for each of the second groups. Further, the ranking process can include combining the first score and the second score to determine a third score. For example, the scoring engine 204 can determine and use the first score 236 and the second score 238 to produce the third score 240. Next, the third score can be used to rank the one or more first content items in each of the first groups and the one or more second content items in each of the second groups.

Stage 408 determines whether to modify the one or more first content items based on the ranking. For example, the clustering engine 202 can determine whether to modify the one or more first content items (e.g., adjusting a ranking of the advertisements) based on the ranking. For example, the first k highest ranked advertisements, e.g., k=3, may be shown according to this ranking and therefore the top three advertisements are not modified. The remaining advertisements, e.g., ranks 4 . . . m, can, however, be selected to include advertisements from the highest rated advertisement clusters as defined by the third scores. Thus, advertisements in contexts that were under-represented (or not represented at all) in the original ranking of advertisements can be displayed according to the adjusted advertisement ranking.

Figure 5:
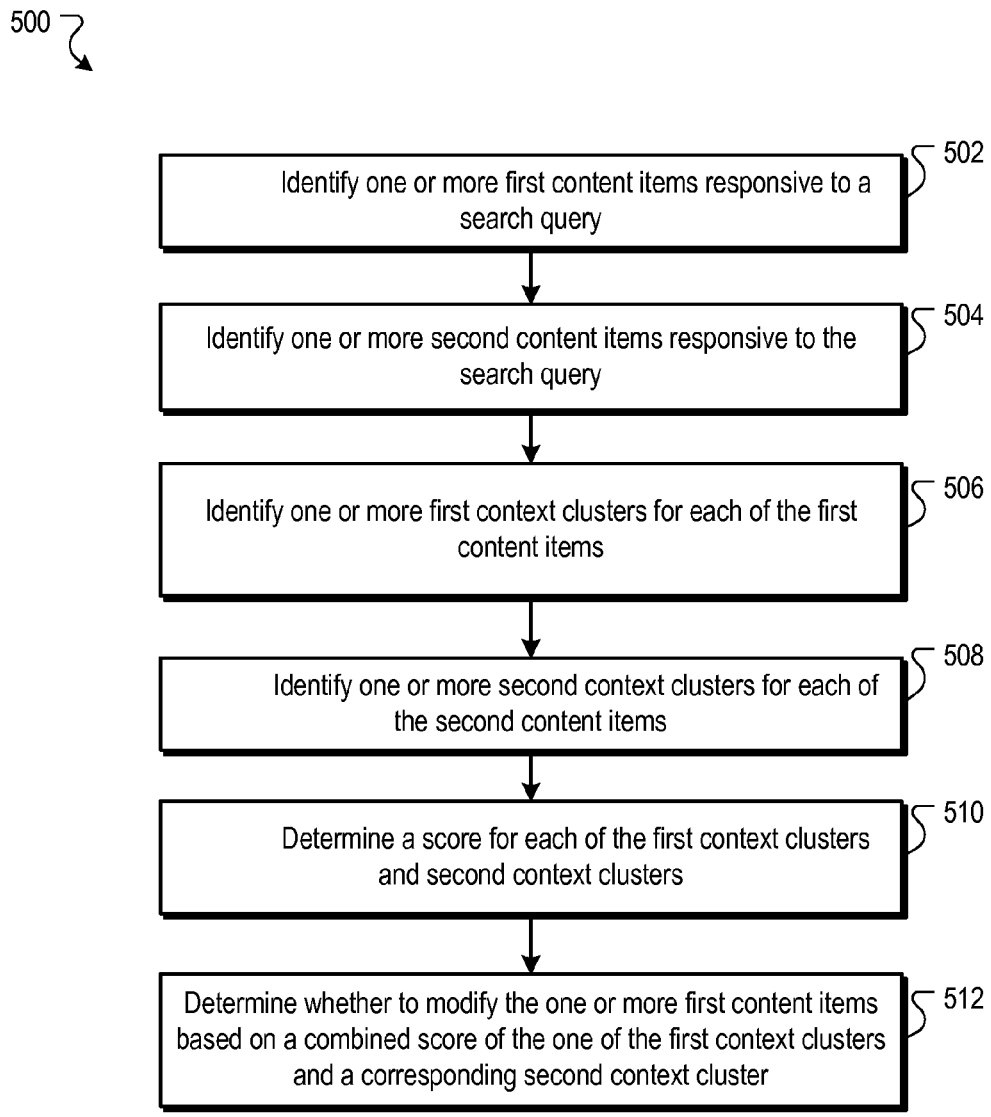
FIG. 5 is an example process for modifying content items based on a context score.

FIG. 5 is an example process 500 for modifying content items based on a context score. The process 500 can, for example, be implemented in a system such as the content scoring system 200 of FIGS. 2A and 2B.

Stage 502 identifies one or more first content items responsive to a search query. For example, the clustering engine 202 can identify one or more first content items responsive to a search query. In one implementation, the first content items include advertisements.

Stage 504 identifies one or more second content items responsive to the search query. For example, the clustering engine 202 can identify one or more second content items responsive to the search query. In one implementation, the second content items include search results, or other web content.

Stage 506 identifies one or more first context clusters for each of the first content items. For example, the clustering engine 202 can identify one or more first context clusters for each of the first content items. In particular, clustering engine 202 can cluster advertisements with respect to context and/or topic similarity.

Stage 508 identifies one or more second context cluster for each of the second content items. For example, the clustering engine 202 can identify one or more second context clusters for each of the second content items. In particular, clustering engine 202 can cluster search results with respect to context and/or topic similarity.

Stage 510 determines a score for each of the first context clusters and second context clusters. For example, the scoring engine 204 can determine a score for each of the first context clusters and second context clusters. In one implementation, the scoring engine 204 can compute a score for the first context cluster 212 which can include contextually similar advertisements. Similarly, the scoring engine 204 can determine a score for the second context cluster 216 which can include contextually similar search results.

Stage 512 determines whether to modify the one or more first content items based on a combined score of the one of the first context clusters and a corresponding second context cluster. In particular, the clustering engine 202 can use the ranked list to alter the list of ranked advertisements to display. For instance, the clustering engine 202 can leave the top 3 spots the same, but then can choose to include some other highly rated advertisements from another list or cluster. The clustering engine 202 can, for example, select other advertisement clusters based on under-represented advertisements or unrepresented advertisements. Other algorithms and formulas can be used to determine rankings for content items.

Figure 6:
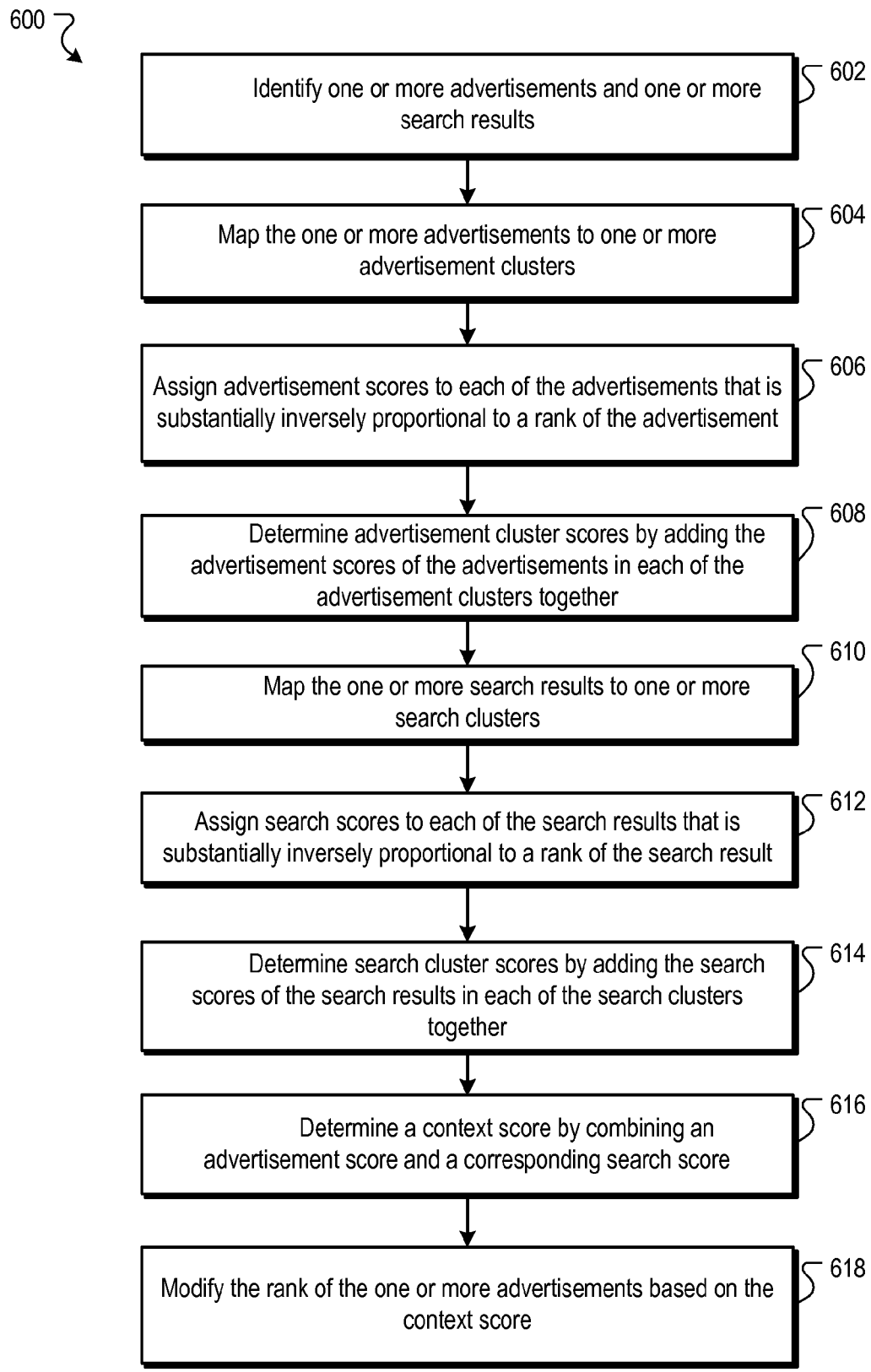
FIG. 6 is another example process for adjusting the ranking of a content item.

FIG. 6 is another example process 600 for adjusting the ranking of a content item. The process 600 can, for example, be implemented in a system such as the content scoring system 200 of FIGS. 2A and 2B.

Stage 602 identifies one or more advertisements and one or more search results. In particular, each of the one or more advertisements and the one or more search results can, for example, be associated with a rank. For example, the clustering engine 202 can identify one or more advertisements and one or more search results associated with their respective ranks. In one implementation, the one or more advertisements are identified in response to a search query. In the same or another implementation, the one or more search results are identified in response to a search query.

Stage 604 maps the one or more advertisements to one or more advertisement clusters. For example, clustering engine 202 can map the one or more advertisements to the one or more advertisement clusters.

Stage 606 assigns advertisement scores to each of the advertisements that are substantially inversely proportional to a rank of the advertisement. For example, the scoring engine 204 can assign advertisement scores to each of the advertisements that are substantially inversely proportional to the rank of the advertisement.

Stage 608 determines advertisement cluster scores by adding the advertisement scores of the advertisements in each of the advertisement clusters together. For example, the scoring engine 204 can determine advertisement cluster scores by adding the advertisement scores of the advertisements in each of the advertisement clusters together. For instance, the scoring engine 204 can add the score for each ranked advertisement candidate together.

Stage 610 maps the one or more search results to one or more search clusters. For example, clustering engine 202 can map the one or more search results to the one or more advertisement clusters.

Stage 612 assigns search scores to each of the search results that are substantially inversely proportional to a rank of the search result. For example, the scoring engine 204 can assign search scores to each of the search results that are substantially inversely proportional to the rank of the search result.

Stage 614 determines search cluster scores by adding the search scores of the search results in each of the search clusters together. For example, the scoring engine 204 can determine search cluster scores by adding the search scores of the search results in each of the search clusters together. For instance, the scoring engine 204 can add the score for each ranked search result together.

Stage 616 determines a context score by combining an advertisement cluster score and a corresponding search cluster score. For example, the scoring engine 204 can determine a context score by combining an advertisement cluster score and the corresponding search cluster score.

Stage 618 modifies the rank of the one or more advertisements based on the context score. For example, the scoring engine 204 can modify the rank of the one or more advertisements based on the context score of the combined advertisement score and corresponding search score. In the event that the above scoring mechanism does not provide diverse advertising content, content scoring system 200 can employ a different algorithm or formula to create a new ranked list of advertisements for display.

Figure 7:
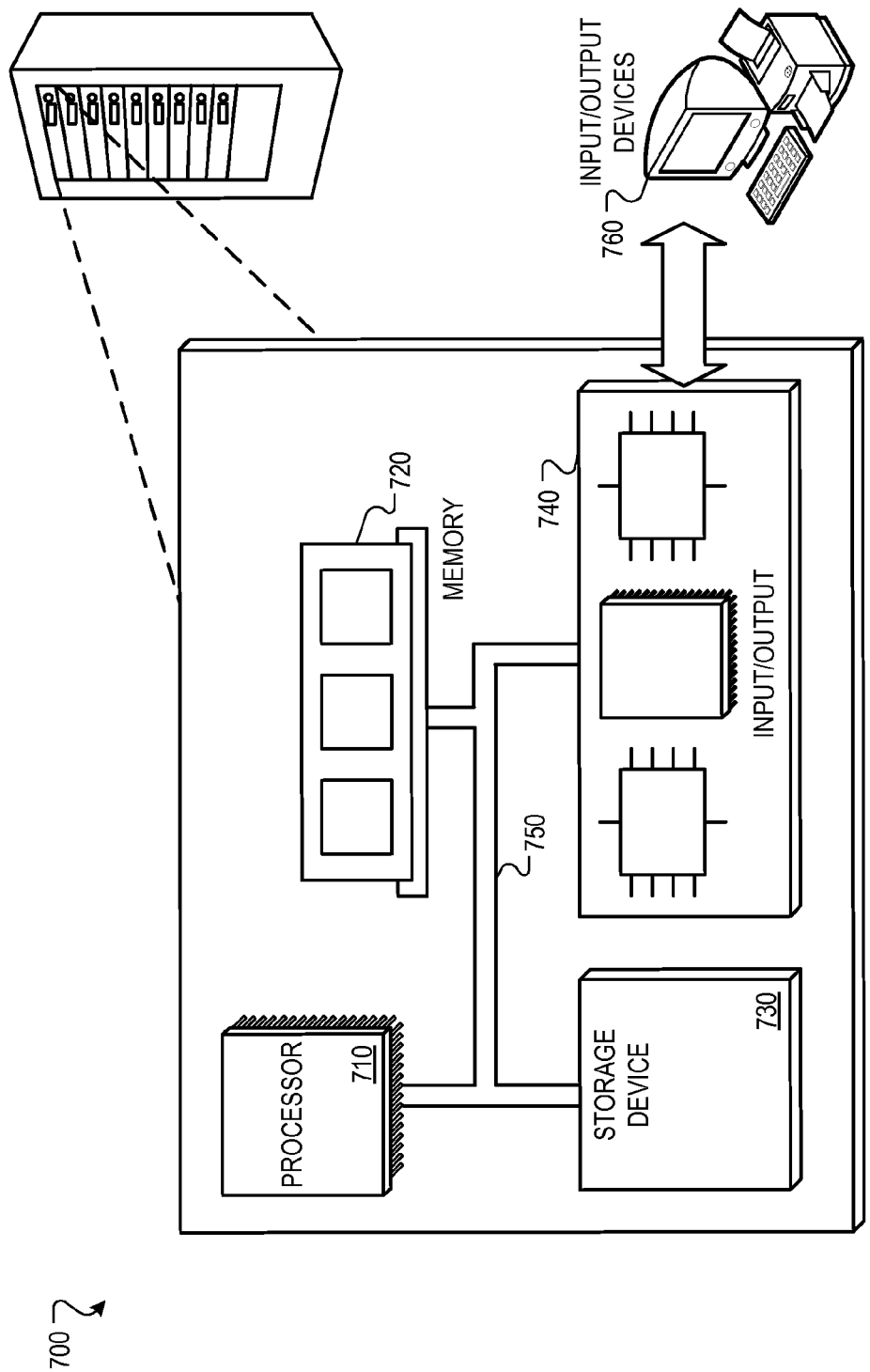
FIG. 7 is a schematic diagram of an example computer system that can be utilized to implement the systems and methods described herein.

FIG. 7 is block diagram of an example computer system 700. The system 700 includes a processor 710, a memory 720, a storage device 730, and an input/output device 740. Each of the components 710, 720, 730, and 740 can, for example, be interconnected using a system bus 750. The processor 710 is capable of processing instructions for execution within the system 700. In one implementation, the processor 710 is a single-threaded processor. In another implementation, the processor 710 is a multi-threaded processor. The processor 710 is capable of processing instructions stored in the memory 720 or on the storage device 730.

The memory 720 stores information within the system 700. In one implementation, the memory 720 is a computer-readable medium. In one implementation, the memory 720 is a volatile memory unit. In another implementation, the memory 720 is a non-volatile memory unit.

The storage device 730 is capable of providing mass storage for the system 700. In one implementation, the storage device 730 is a computer-readable medium. In various different implementations, the storage device 730 can, for example, include a hard disk device, an optical disk device, or some other large capacity storage device.

The input/output device 740 provides input/output operations for the system 700. In one implementation, the input/output device 740 can include one or more network interface devices, e.g., an Ethernet card, a serial communication device, e.g., and a RS-232 port, and/or a wireless interface device, e.g., and a 702.11 card. In another implementation, the input/output device can include driver devices configured to receive input data and send output data to other input/output devices, e.g., keyboard, printer, and display devices 760. Other implementations, however, can also be used, such as mobile computing devices, mobile communication devices, set-top box television client devices, etc.

Although the above description refers to a content item such as an advertisement, content items such as video and/or audio files, web pages for particular subjects, news articles, etc. can also be used. For example, if a user clicks on a video file, then the owner or publisher of the video file can also generate revenue every time a user clicks on the video file. A threshold measure can also be determined for the video file according to one or more parameters associated with the video file, e.g., a click-through rate and/or a cost-per-click of the video file.

The apparatus, methods, flow diagrams, and structure block diagrams described in this patent document may be implemented in computer processing systems including program code comprising program instructions that are executable by the computer processing system. Other implementations may also be used. Additionally, the flow diagrams and structure block diagrams described in this patent document, which describe particular methods and/or corresponding acts in support of steps and corresponding functions in support of disclosed structural means, may also be utilized to implement corresponding software structures and algorithms, and equivalents thereof.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A method implemented by a computer, the method comprising:

identifying, by a computer, first groups of one or more first content items, wherein each of the first groups is defined by one or more first content items grouped under a context corresponding to the first group, and each first group has a different corresponding context;

generating, by the computer, a first score for each of the one or more first groups;

identifying, by the computer, second groups of one or more second content items, wherein each of the second groups is defined by one or more second content items grouped under a context corresponding to the second group, and each second group has a different corresponding context;

generating by the computer, a second score for each of the one or more second groups;

identifying, by the computer, corresponding group pairs, each corresponding group pair being a first group and a second group having a same corresponding context;

generating, by the computer, third scores for the corresponding group pairs, each third score being for a corresponding group pair and being based on the respective first score and second score of the first group and the second group of the corresponding group pair;

adjusting, by the computer, a ranking of the one or more first content items based on the third scores to create a diversified ranking in which a first content item grouped under a first context corresponding to a first group and a first content item grouped under a second context corresponding to a second group are presented with one or more second content items;

providing data, by the computer, of the diversified ranking of the one or more first content items.

2. The method of claim 1, further comprising:
identifying the one or more first content items based on a web page content.

3. The method of claim 1, further comprising:
identifying the one or more second content items based on a web page content.

4. The method of claim 1, further comprising:
identifying the one or more first content items based on a search query.

5. The method of claim 1, further comprising:
identifying the one or more second content items based on a search query.

6. The method of claim 1, wherein generating a first score comprises:
assigning first content scores to each of the first content items that is substantially inversely proportional to a rank of the first content item;
adding the first content scores of same grouped first content items together.

7. The method of claim 1, wherein generating a second score comprises:
assigning second content scores to each of the second content items that is substantially inversely proportional to a rank of the second content item; and
adding the second content scores of same grouped second content itemstogether.

8. The method of claim 1, wherein each of the first content items is an advertisement.

9. The method of claim 1, wherein each of the second content items is a search result.

10. A method implemented by a computer, the method comprising:
identifying, by a computer, first groups of one or more first content items, each first group defined by one or more first content items that are grouped under a context corresponding to the first group, and wherein each first group has a different corresponding context;
identifying, by the computer, second groups, each second group defined by one or more second content items that are grouped under a context corresponding to the second group, and wherein each second group has a different corresponding context;
scoring, by the computer, the one or more first content items in each of the first groups and the one or more second content items in each of the second groups;
scoring, by the computer, the first groups and the second groups;
identifying, by the computer, corresponding group pairs, each corresponding group pair being a first group and a second group having the same corresponding context;

generating, by the computer, combined group scores, each combined group score being generated for each corresponding group pair, the combined group score being based on the respective first score and second score of the first group and the second group of the corresponding group pair;

determining, by the computer, whether to diversify a ranking of the one or more first content items based on the combined group scores wherein a first content item grouped under a first context corresponding to a first group and a first content item grouped under a second context corresponding to a second group are presented with one or more second content items;

in response to determining to diversify the ranking of the one or more first content items, providing, by a computer, data of a diversified ranking of the one or more first content items.

11. The method of claim 10, wherein at least one of the one or more second groups correspond to at least one of the one or more first groups.

12. The method of claim 10, wherein scoring, by the computer, the first groups and the second groups comprises:
assigning to each of the first groups a value derived from the sum of the one or more first content items that are grouped under a context corresponding to respective first group;
assigning to each of the second groups a value derived from the sum of the one or more second content items that are grouped under a context corresponding to respective second group.

13. The method of claim 10, wherein scoring, by the computer, the first groups and the second groups comprises:
determining first scores for each of the one or more first content items in each of the first groups, each first score substantially inversely proportional to a ranking of the one or more first content items;
determining second scores for each of the one or more second content items in each of the second groups, each second score substantially inversely proportional to a ranking of the one or more second content items.

14. The method of claim 13, wherein determining first scores for each of the one or more first content items comprises:
assigning first content scores to each of the first content items that is substantially inversely proportional to a rank of the first content item; and
adding the first content scores together.

15. The method of claim 13, wherein determining second scores for each of the one or more second content items comprises:
assigning second content scores to each of the second content items that is substantially inversely proportional to a rank of the second content item; and
adding the second content scores together.

16. A method implemented by a computer, the method comprising:
receiving, by a computer, advertisements responsive to a search query;
receiving, by the computer, search results responsive to the search query;
identifying, by the computer, advertisement context clusters for the advertisements, each advertisement context cluster defined by one or more of the advertisements that are grouped under a topic corresponding to the advertisement context cluster, and wherein each advertisement context cluster has a different corresponding topic;

identifying, by the computer, search result context clusters for the search results, each search result context cluster defined by one or more of the search results that are grouped under a topic corresponding to the search result context cluster, and wherein each search result cluster has a different corresponding topic;

determining, by the computer, a score for each of the advertisement context clusters and the search result context clusters;

identifying, by the computer, corresponding cluster pairs, each corresponding cluster pair being an advertisement context cluster and a search result context cluster having the same corresponding topic;

generating, by the computer, combined cluster scores for the corresponding cluster pairs, each combined cluster score being for a corresponding cluster pair and being based on a respective score for an advertisement context cluster of the corresponding cluster pair and a respective score for a search result context cluster of the corresponding cluster pair;

adjusting, by the computer, a presentation ranking of the advertisements based on the combined cluster scores, wherein the presentation ranking of the advertisements is diversified according to the combined cluster scores so that at least a first advertisement grouped under a first topic and at least a second advertisement grouped under a second topic are presented with the search results;

providing data, by the computer, that cause presentation of diversified advertisements on a client device.

17. A method implemented by a computer, the method comprising:

receiving, by a computer, one or more advertisements and one or more search results, wherein the one or more advertisements and one or more search results are each associated with a rank;

mapping, by the computer, the one or more advertisements to one or more advertisement clusters, wherein each advertisement cluster has a different context;

assigning, by the computer, an advertisement score to each of the advertisements that is substantially inversely proportional to a rank of the advertisements; and determining, by the computer, advertisement cluster scores by adding advertisement scores of the advertisements in each of the advertisement clusters together;

mapping, by the computer, the one or more search results to one or more search clusters, wherein each search cluster has a different context;

assigning, by the computer, a search score to each of the search results that is substantially inversely proportional to a rank of the search result;

determining, by the computer, search cluster scores by adding search scores of the search results in each of the search clusters together;

identifying, by the computer, corresponding group pairs, each corresponding group pair being an advertisement cluster and a search cluster having the same corresponding context;

generating, by the computer, a context score by combining an advertisement cluster score for an advertisement cluster of a corresponding group pair and a search cluster score for a search cluster of the corresponding group pair;

producing, by the computer, a diversified ranking of the one or more advertisements based on the context score wherein a first advertisement clustered under a first context and a second advertisement grouped under a second context are presented with the one or more search results;

providing data, by the computer, of the diversified ranking of the one or more advertisements.

18. The method of claim 17, wherein the one or more advertisements are returned in response to a search query.

19. The method of claim 17, wherein the one or more search results are returned in response to a search query.

20. A system, comprising:

a clustering engine, implemented as part of a system comprising one or more computing devices, that identifies one or more first groups of one or more same context first content items, with each of the one or more first groups having a different corresponding context, and identifies one or more second groups of one or more same context second content items, with each of the one or more second content items having a different corresponding context, and identifies at least one or more corresponding group pairs, each corresponding group pair being a first group and a second group having the same corresponding context; and a scoring engine, implemented as part of the system comprising one or more computing devices, that determines a first score for each of the one or more first groups, determines a second score for each of the one or more second groups, determines third scores for each corresponding group pair based on the respective first scores and second scores of the corresponding group pair, and provides diversified ranking of the one or more first content items based on the third scores.

21. The system of claim 20, wherein the clustering engine: identifies the one or more first content items based on a web page content.

22. The system of claim 20, wherein the clustering engine: identifies the one or more second content items based on a web page content.

23. The system of claim 20, wherein the clustering engine: identifies the one or more first content items based on a search query.

24. The system of claim 20, wherein the clustering engine: identifies the one or more second content items based on a search query.

25. A system, comprising:

a data processing apparatus configured to perform operations comprising:

identifying one or more first groups of one or more first content items, wherein each first group has a different corresponding topic;

identifying one or more second groups of one or more second content items, wherein the one or more second groups correspond to the one or more first groups, and wherein each second group has a different corresponding topic;

ranking the one or more first groups and the one or more second groups;

identifying, by the computer, corresponding group pairs, each corresponding group pair being a first group and a second group having a same corresponding topic;

generating a combined group score for each corresponding group pair, each combined group score based on the respective first score and second score of the first group and the second group of the corresponding group pair; and diversifying the one or more first content items based on the combined group score.

\* \* \* \* \*

UNITED STATES PATENT AND TRADEMARK OFFICE
CERTIFICATE OF CORRECTION

| | |
|---|---|
| PATENT NO. | : 8,468,083 B1 |
| APPLICATION NO. | : 11/837070 |
| DATED | : June 18, 2013 |
| INVENTOR(S) | : Piotr Szulczewski |

It is certified that error appears in the above-identified patent and that said Letters Patent is hereby corrected as shown below:

In the Claims:

Claim 7, Column 17, Line 43 – delete "itemstogether." and insert -- items together. --, therefore Signed and Sealed this
Seventeenth Day of September, 2013

Teresa Stanek Rea
*Deputy Director of the United States Patent and Trademark Office*

UNITED STATES PATENT AND TRADEMARK OFFICE
CERTIFICATE OF CORRECTION

| | |
|---|---|
| PATENT NO. | : 8,468,083 B1 |
| APPLICATION NO. | : 11/837070 |
| DATED | : June 18, 2013 |
| INVENTOR(S) | : Szulczewski |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1647 days.

Signed and Sealed this
Fourth Day of November, 2014

Michelle K. Lee
*Deputy Director of the United States Patent and Trademark Office*